(12) United States Patent
Koski et al.

(10) Patent No.: US 7,677,624 B1
(45) Date of Patent: Mar. 16, 2010

(54) RECREATIONAL VEHICLE OUTDOOR CARPET SYSTEM

(76) Inventors: Randy L. Koski, 1207 NW. 50th St., Vancouver, WA (US) 98663; Marla K. Koski, 1207 NW. 50th St., Vancouver, WA (US) 98663

( * ) Notice: Subject to any disclaimer, the term of this patent is extended or adjusted under 35 U.S.C. 154(b) by 0 days.

(21) Appl. No.: 12/327,886

(22) Filed: Dec. 4, 2008

(51) Int. Cl.
*B60J 9/00* (2006.01)
(52) U.S. Cl. .................................... 296/1.07
(58) Field of Classification Search .............. 296/1.07, 296/98, 146, 156, 162; 242/370, 390, 390.2, 242/397, 398, 399, 403, 404
See application file for complete search history.

(56) References Cited

U.S. PATENT DOCUMENTS

| | | | |
|---|---|---|---|
| 1,719,055 A | | 7/1929 | Herzer |
| 2,354,832 A | | 8/1944 | Ristine |
| 2,723,156 A | * | 11/1955 | Stanziale ................. 296/98 |
| 2,724,395 A | * | 11/1955 | Valentine ................. 296/98 |
| 3,146,824 A | * | 9/1964 | Veilleux ................. 160/23.1 |
| 3,563,594 A | * | 2/1971 | London ................. 293/128 |
| 4,195,875 A | | 4/1980 | Venne |
| D290,317 S | | 6/1987 | Tristan |
| 4,991,789 A | | 2/1991 | Buerger |
| 5,152,572 A | * | 10/1992 | Ellis ................. 296/97.23 |
| 5,669,574 A | | 9/1997 | Calhoun |
| D410,360 S | | 6/1999 | Aranzazu |

* cited by examiner

*Primary Examiner*—H Gutman

(57) ABSTRACT

A recreational vehicle outdoor carpet system includes a recreational vehicle that has a bottom wall. A housing is attached to the bottom wall. The housing has an open end and a casing is mounted in the housing. The casing is selectively positioned in stored position positioned within the housing or in a deployed position extending outwardly of the open end. A spindle is rotatably mounted in the casing. A flexible panel defines a rug having a first end edge and a second end edge disposed opposite of each other. The first end edge is attached to the spindle. The spindle is rotated in a first direction to position the panel in a rolled up configuration on the spindle and rotated in a second direction remove the panel from the spindle to position the panel on a ground surface.

8 Claims, 11 Drawing Sheets

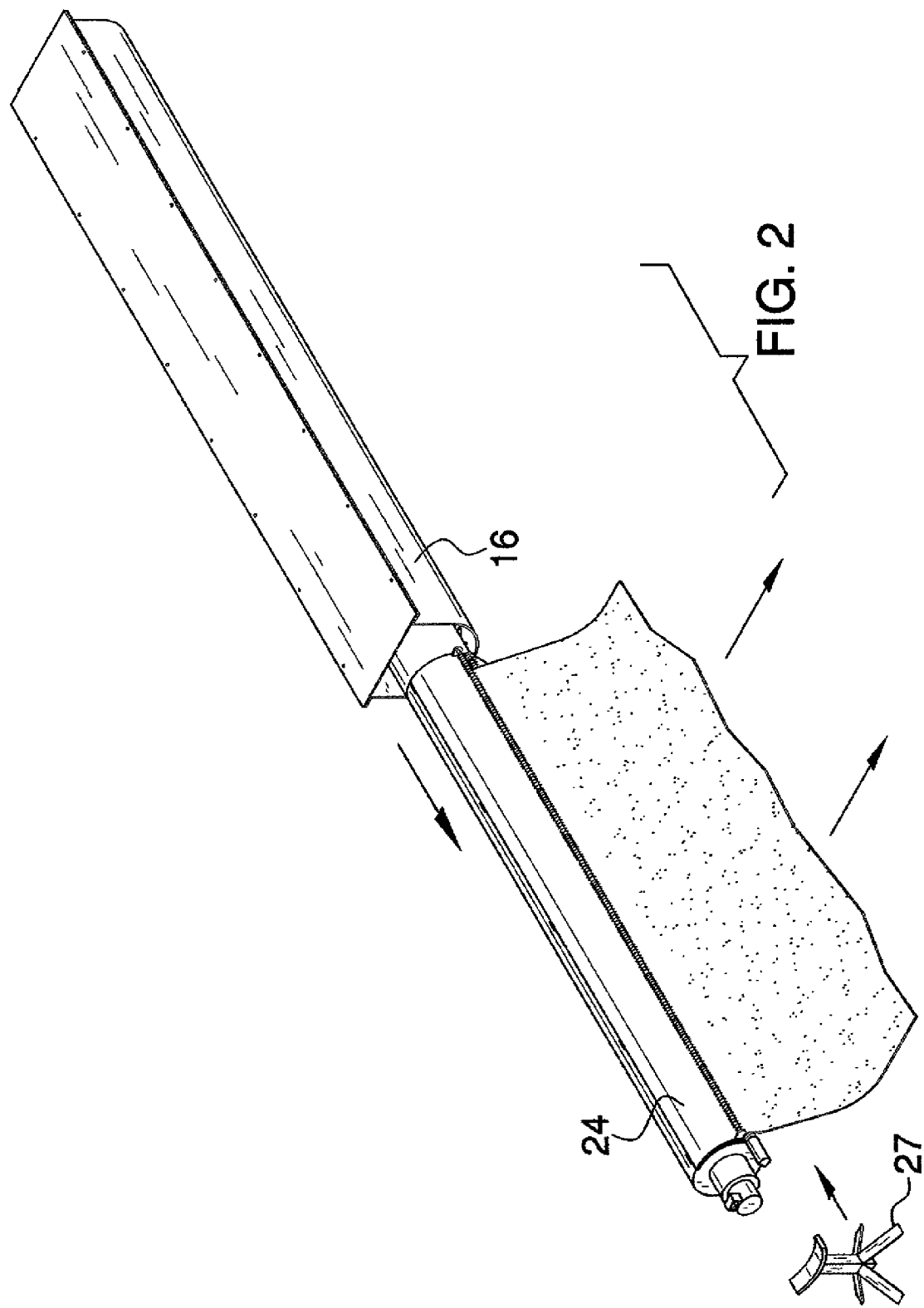

RECREATIONAL VEHICLE OUTDOOR CARPET SYSTEM

BACKGROUND OF THE INVENTION

Field of the Invention

The present invention relates to outdoor ground covering devices and more particularly pertains to a new outdoor ground covering device for attaching a storable rug to an underside of a recreational vehicle.

SUMMARY OF THE INVENTION

The present invention meets the needs presented above by generally comprising a recreational vehicle that has a bottom wall. A housing is attached to the bottom wall. The housing has an open end positioned adjacent to a lateral wall of the vehicle and is directed laterally with respect to the vehicle. A casing is mounted in the housing. The casing is selectively positioned in stored position positioned within the housing or in a deployed position extending outwardly of the open end. The casing includes a first end wall, a second end wall and a perimeter wall extending between the first and second end walls. The casing has a door therein extending between the first and second end walls. A spindle is rotatably mounted in the casing and extends between the first and second end walls. A flexible panel defining a rug has a first end edge and a second end edge disposed opposite of each other. The first end edge is attached to the spindle. The spindle is rotated in a first direction to position the panel in a rolled up configuration on the spindle and rotated in a second direction remove the panel from the spindle to position the panel on a ground surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top perspective view of the present invention.

DESCRIPTION OF THE PREFERRED EMBODIMENT

Figure 1:
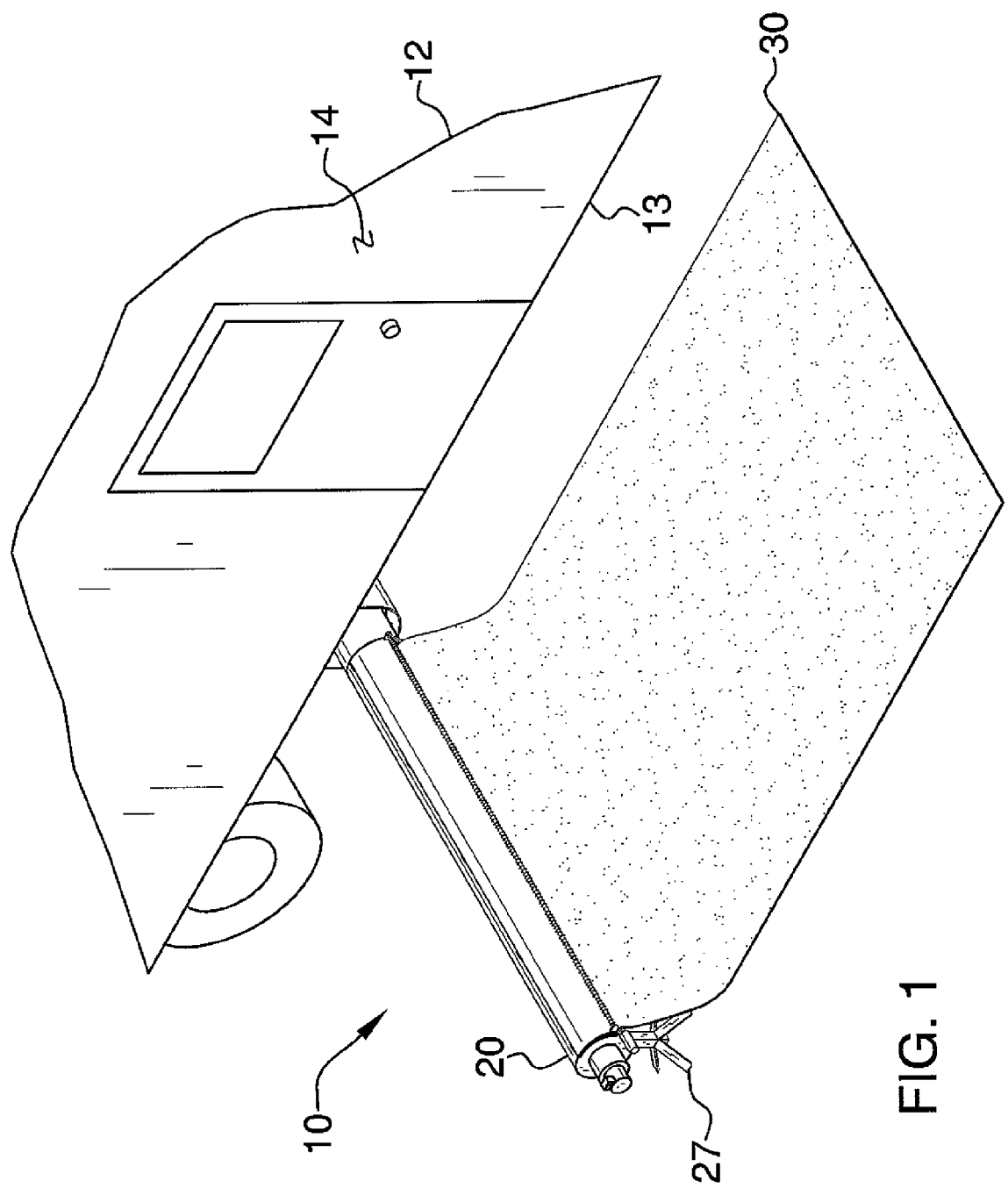
FIG. 1 is a top perspective view of a recreational vehicle outdoor carpet system according to the present invention.
Figure 1A:
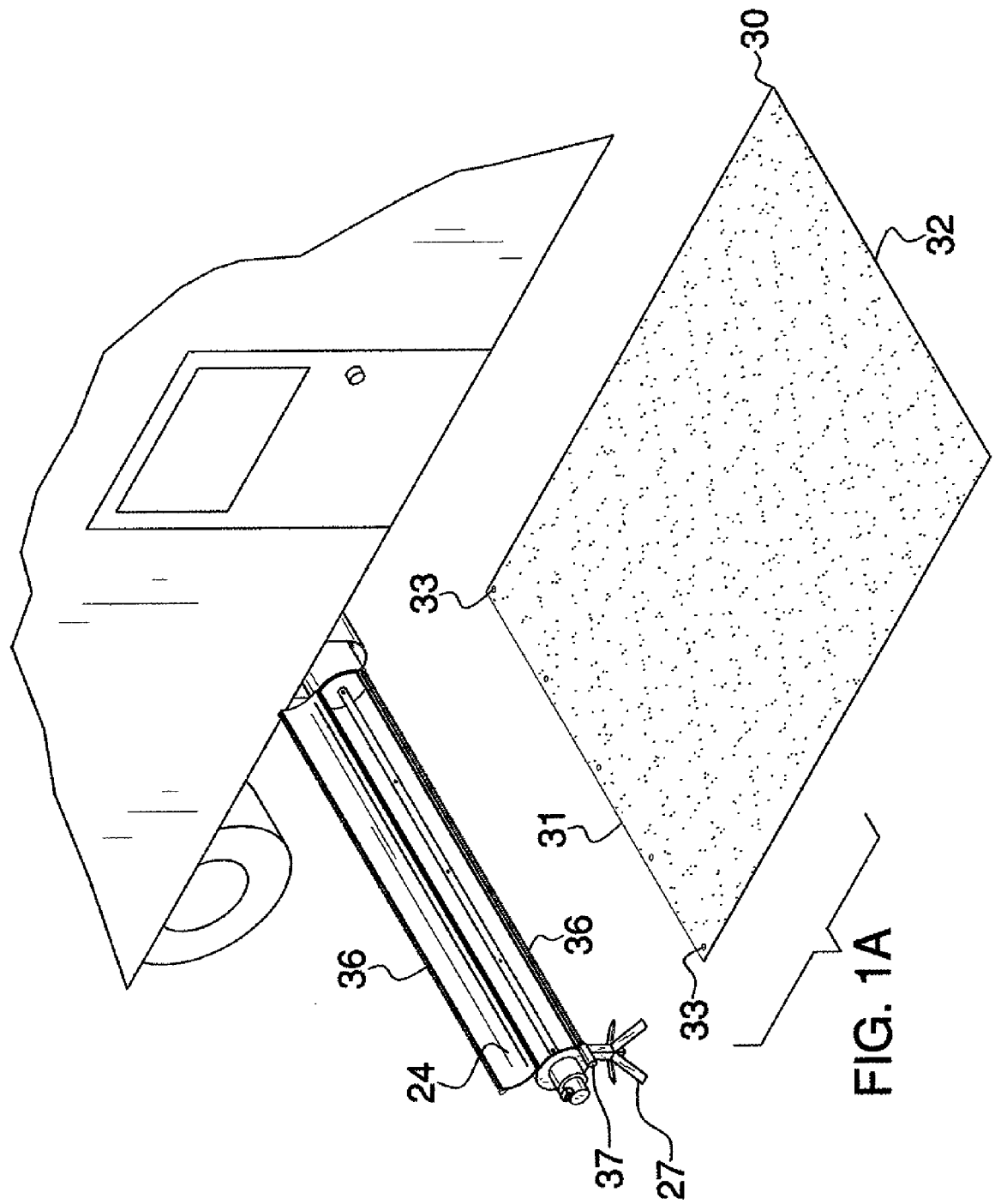
FIG. 1A is a top perspective view of a recreational vehicle outdoor carpet system according to the present invention.
Figure 3:
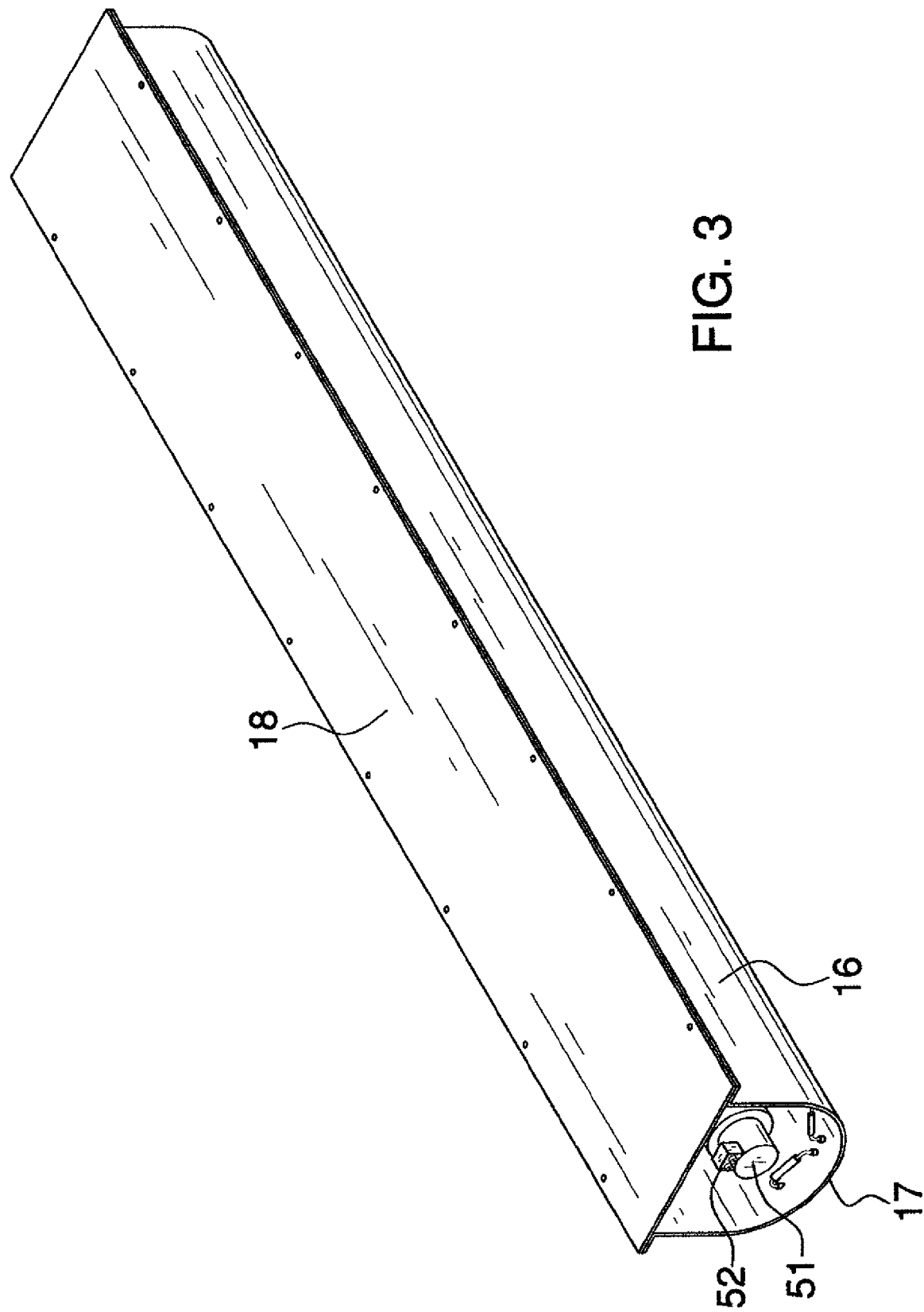
FIG. 3 is a top perspective view of the present invention in a stored position.
Figure 4:
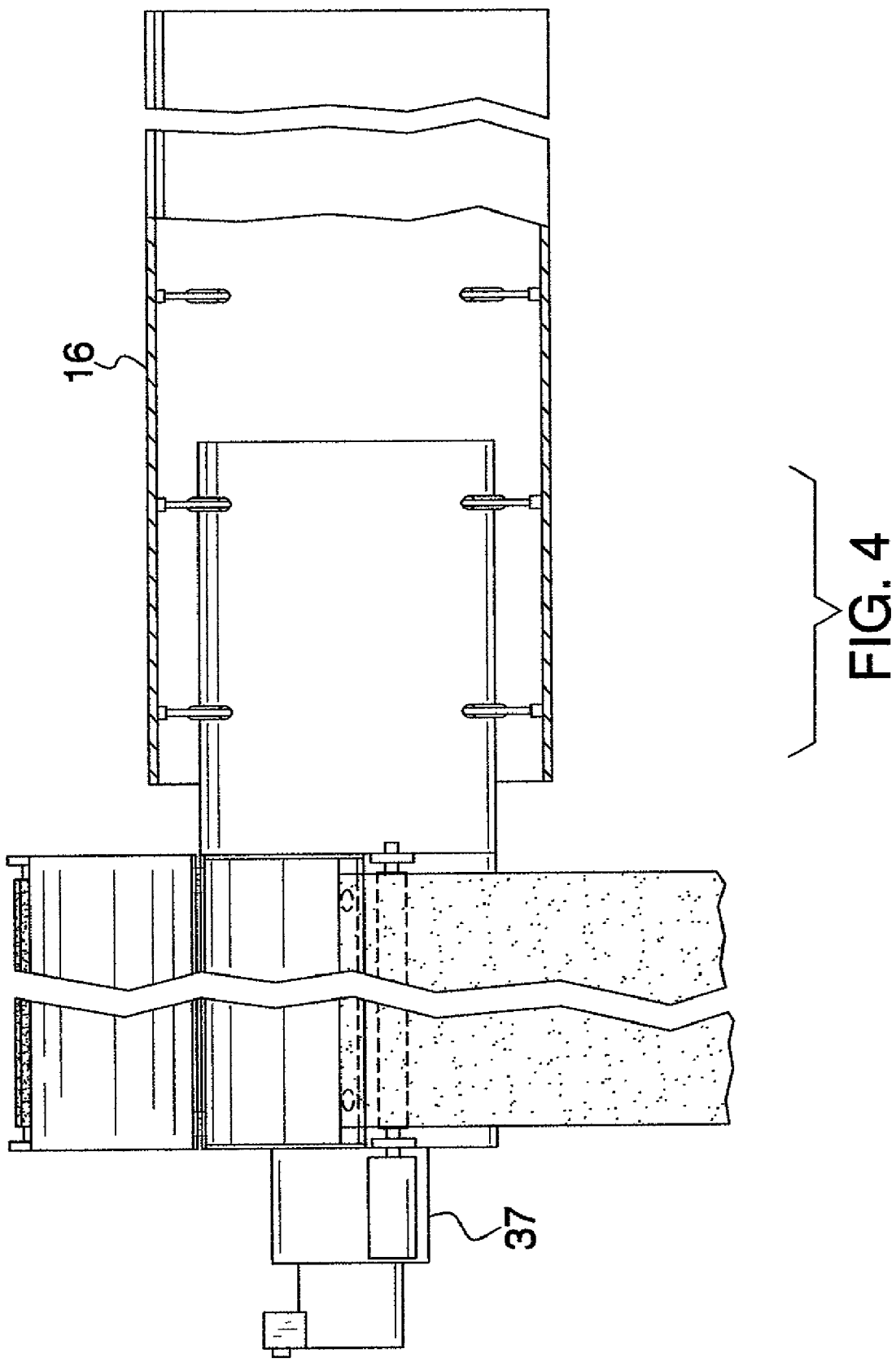
FIG. 4 is a top broken view of the present invention.
Figure 5:
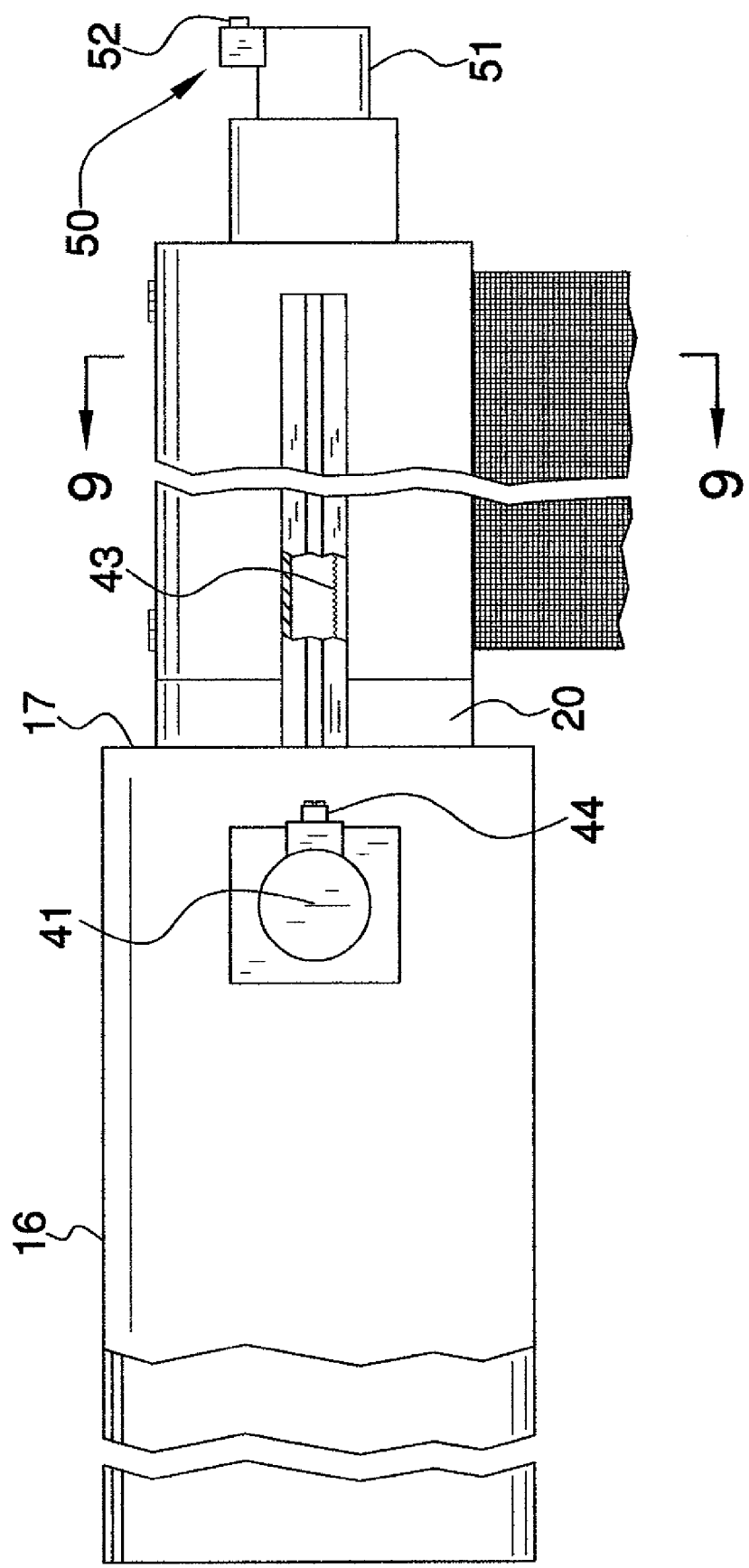
FIG. 5 is a broken rear view of the present invention.
Figure 6:
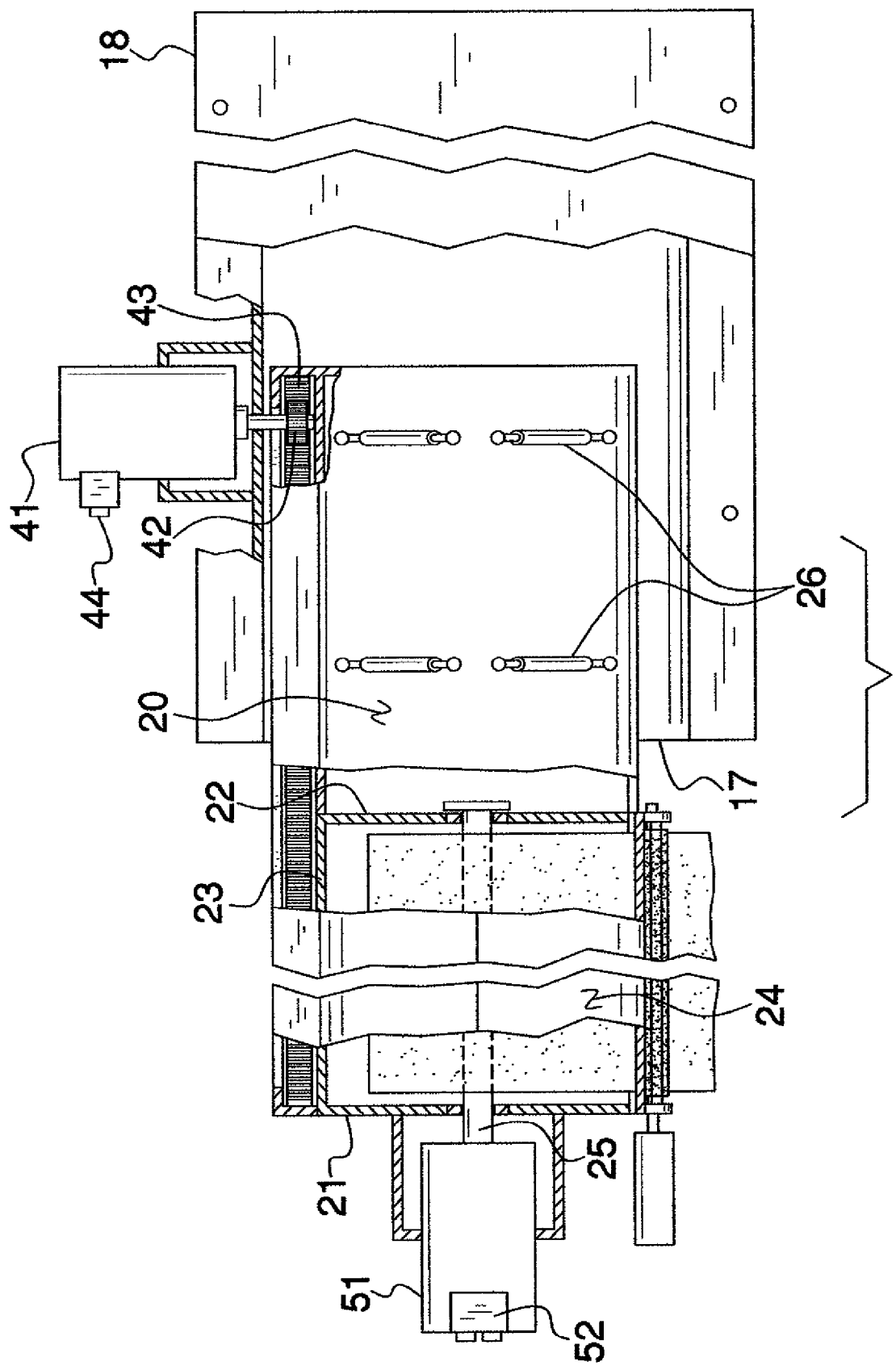
FIG. 6 is a top broken view of the present invention.
Figure 7:
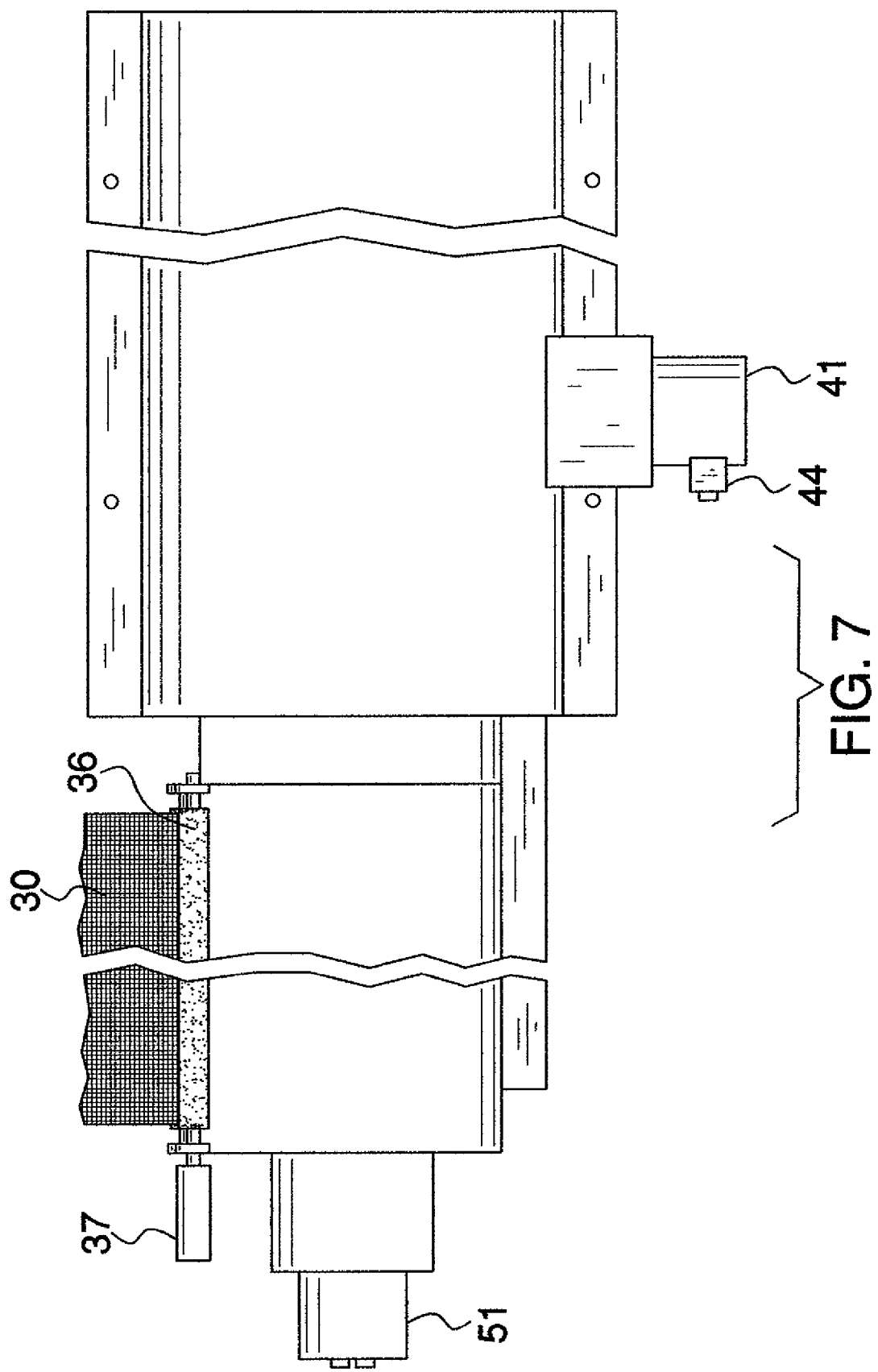
FIG. 7 is a broken bottom view of the present invention.
Figure 8:
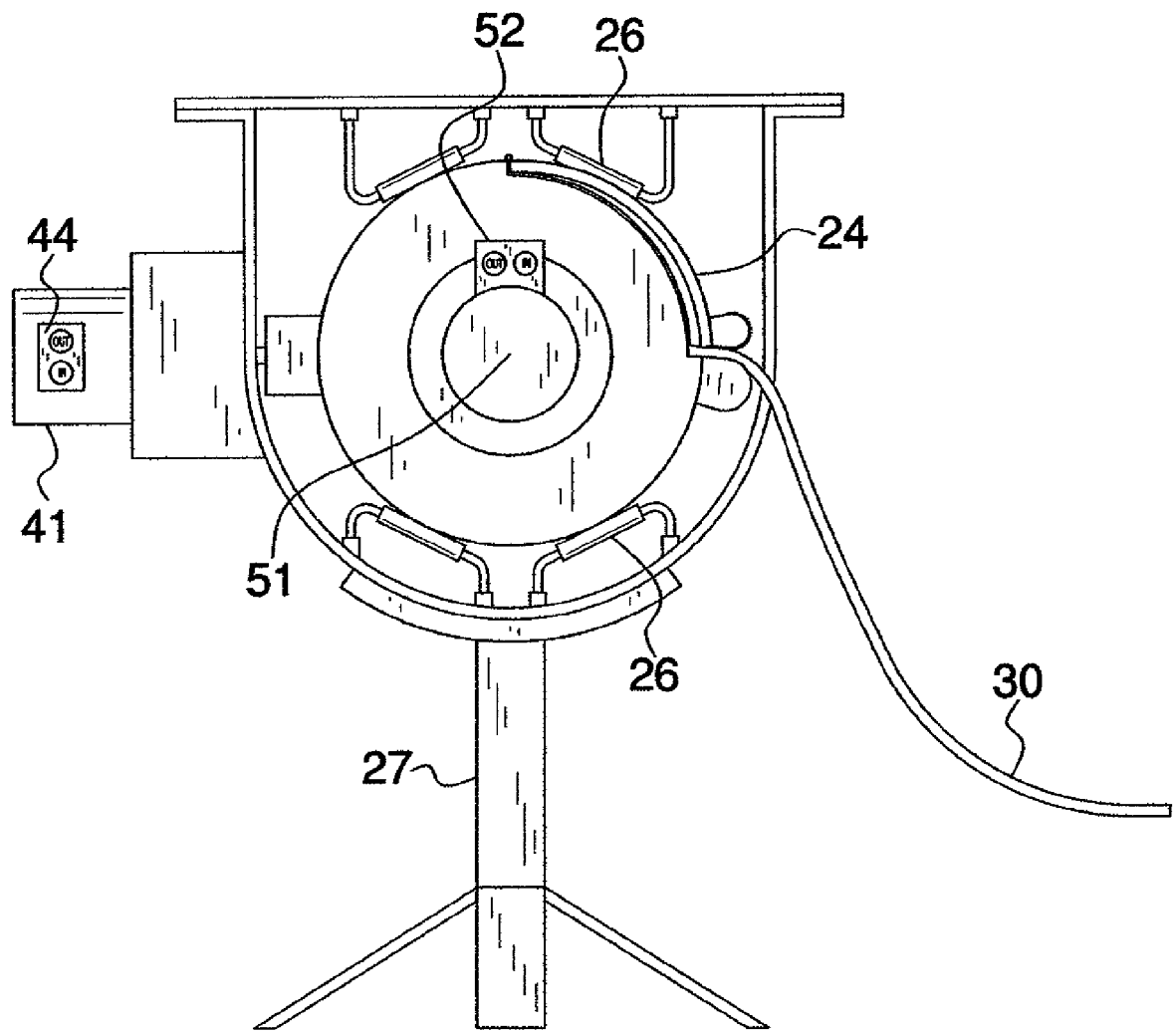
FIG. 8 is an end view of the present invention.
Figure 9:
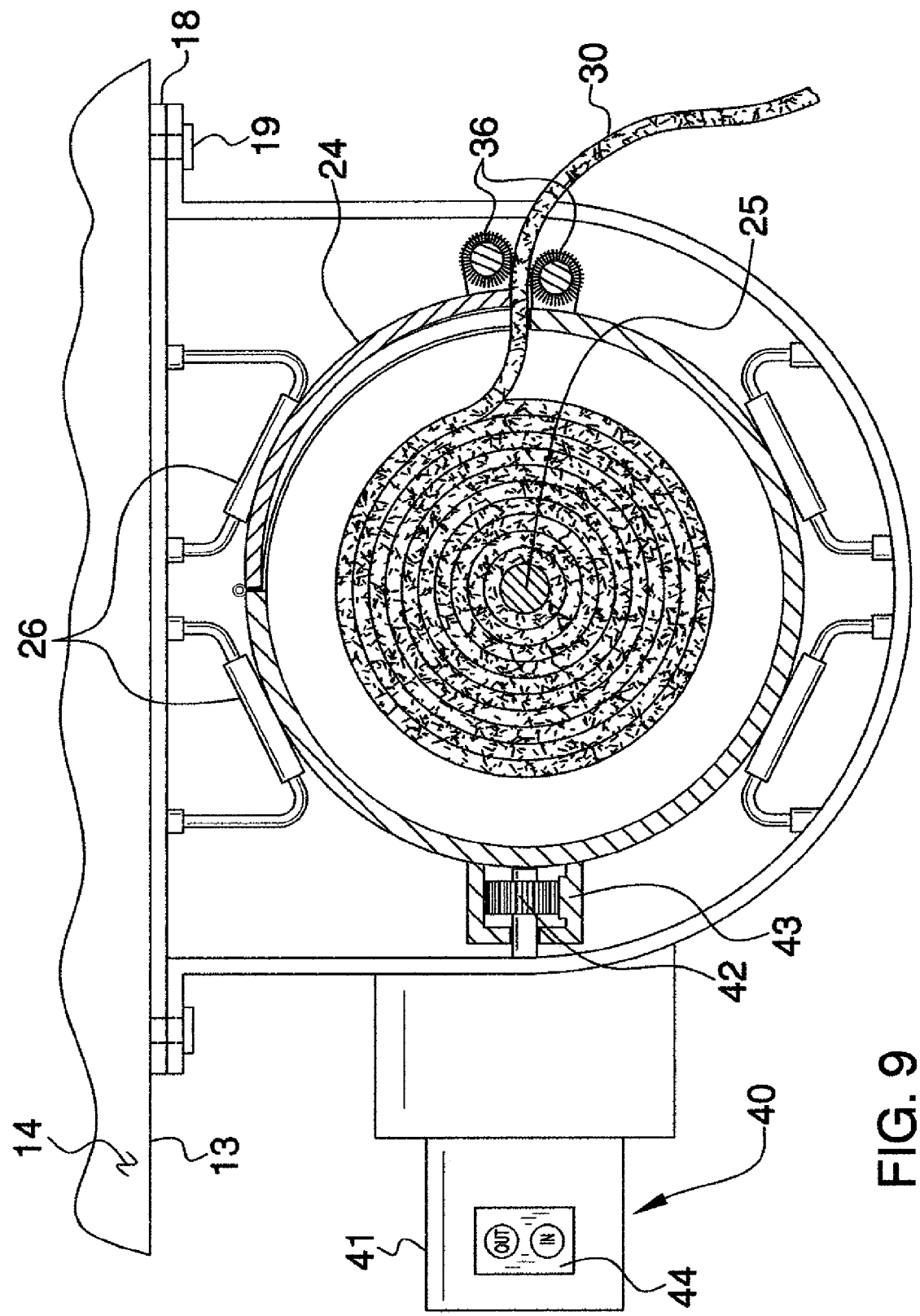
FIG. 9 is a cross-sectional view taken along line 9-9 of FIG. 5 of the present invention.
Figure 10:
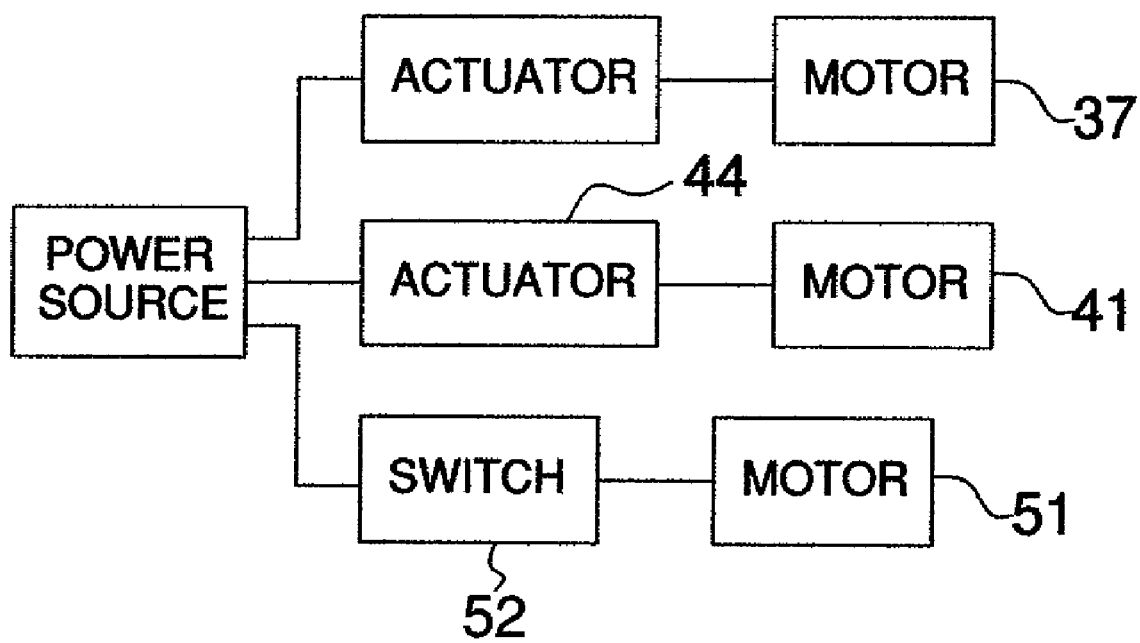
FIG. 10 is a schematic view taken along of the present invention.

With reference now to the drawings, and in particular to FIGS. 1 through 10 thereof, a new outdoor ground covering device embodying the principles and concepts of the present invention and generally designated by the reference numeral 10 will be described.

As best illustrated in FIGS. 1 through 10, the recreational vehicle outdoor carpet system 10 generally comprises a conventional recreational vehicle 12 that has a bottom wall 13. A housing 16 is attached to the bottom wall 12. The housing 16 has an open end 17 positioned adjacent to a lateral wall 14 of the vehicle 12 and is directed laterally with respect to the vehicle 12. The housing 16 may include a mounting plate 18 that is attachable to the recreational vehicle 12 and through which fasteners 19 are extended. The bottom wall 13 may comprise any structure positioned on a lower side of a conventional recreational vehicle 12.

A casing 20 is mounted in the housing 16. The casing 20 is selectively positioned in stored position positioned within the housing 16 or in a deployed position extending outwardly of the open end 17. The casing 20 includes a first end wall 21, a second end wall 22 and a perimeter wall 23 extending between the first 21 and second 22 end walls. The casing 20 has a door 24 therein extending between the first 21 and second 22 end walls. A spindle 25 is rotatably mounted in the housing 20 and extends between the first 21 and second 22 end walls. The housing 16 has a plurality of rollers 26 rotatably mounted therein and the casing 20 is movable along the rollers 26. A stand 27 may be provided to support the casing 20 when it is in a fully deployed position.

A flexible panel 30 defining a rug has a first end edge 31 and a second end edge 32 disposed opposite of each other. The first end edge 31 is attached to the spindle 25. The spindle 25 is rotated in a first direction to position the panel in a rolled up configuration on the spindle 25 and positioned within the casing and is rotated in a second direction remove the panel 30 from the spindle 25 to position the panel 30 on a ground surface. The panel 30 is removably coupled to the spindle 25 to allow the panel 30 to be removed from the spindle 25. This may be accomplished with a plurality of snaps 33. The panel 30 may be comprised of any conventional material used for outside ground coverings.

A pair of brushes 36 is mounted to the casing 20. The panel 30 is extended between the brushes 36 when the spindle 25 is rolled in the first direction to clean an upper surface and a bottom surface of the panel 30 with the brushes 36. The brushes 36 prevent dirt from entering the casing 30 while cleaning the panel 30. At least one of the brushes 36 may be coupled to a motor 37 to rotate the at least one of the brushes to further clean the panel 30.

An extension assembly 40 mechanically engages the housing 12 with the casing 20. The extension assembly 40 alternates a position of the casing 20 between the stored and deployed positions when the extension assembly 40 is actuated. The extension assembly 40 includes a motor 41 coupled to a gear 42 which engages a track 43 mounted on the casing 20. An actuator 44 coupled to the motor 41 is used to actuate the motor 41 in first and second directions to move the casing inward or outward of the housing 16.

A rotating assembly 50 is mechanically coupled to the spindle 25. The rotating assembly 50 alternates a rotation of the spindle 25 in first and second directions when the rotating assembly 50 is actuated. The rotating assembly 50 includes a motor 51 mounted on the casing 20 and coupled to the spindle 25. A switch 52 is used to actuate the motor 51 in first and second directions to rotate the spindle 25 relative to the casing 20. Each of the rotating 50 and extension 40 assemblies are coupled to an electrical power source 53 which may include batteries or an electrical system of the recreational vehicle 12 to power their respective motors 41, 51.

In use, when the panel 30 is needed for use as a rug outside of a recreational vehicle 12, the casing 20 is extended and the spindle 25 rotated to unfurl the panel 30 from the spindle 25. When a user no longer needs the panel 30, the spindle 25 is rotated to wind the panel 30 onto the spindle 25 and the casing 20 moved back into the housing 16 for storage. The brushes 36 clean the panel 30 between uses.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A ground covering system comprising:
   a recreational vehicle having a bottom wall;
   a housing being attached to said bottom wall, said housing having an open end positioned adjacent to a lateral wall of the vehicle and being directed laterally with respect to the vehicle;
   a casing being mounted in said housing, said casing being selectively positioned in a stored position positioned within said housing or in a deployed position extending outwardly of said open end, said casing including a first end wall, a second end wall and a perimeter wall extending between said first and second end walls, said casing having a door therein extending between said first and second end walls;
   a spindle being rotatably mounted in said casing and extending between said first and second end walls;
   a flexible panel defining a rug has a first end edge and a second end edge disposed opposite of each other, said first end edge being attached to said spindle, said spindle being rotated in a first direction to position said panel in a rolled up configuration on said spindle, said spindle being rotated in a second direction to remove said panel from said spindle to position said panel on a ground surface.

2. The system according to claim 1, wherein said panel is removably coupled to said spindle to allow said panel to be removed from said spindle.

3. The system according to claim 1, further including a pair of brushes being mounted to said casing, said panel being extended between said brushes when said spindle is rolled in said first direction to clean an upper surface and a bottom surface of said panel with said brushes.

4. The system according to claim 1, further including an extension assembly mechanically engaging said housing and said casing, said extension assembly alternating a position of said casing between said stored and deployed positions when said extension assembly is actuated.

5. The system according to claim 4, further including a rotating assembly being mechanically coupled to said spindle, said rotating assembly alternating a rotation of said spindle in the first and second directions when said rotating assembly is actuated.

6. The system according to claim 1, further including a rotating assembly being mechanically coupled to said spindle, said rotating assembly alternating a rotation of said spindle in the first and second directions when said rotating assembly is actuated.

7. The system according to claim 1, further including said housing having a plurality of rollers rotatably mounted therein, said casing being movable along said rollers.

8. A ground covering system comprising:
   a recreational vehicle having a bottom wall;
   a housing being attached to said bottom wall, said housing having an open end positioned adjacent to a lateral wall of the vehicle and being directed laterally with respect to the vehicle;
   a casing being mounted in said housing, said casing being selectively positioned in a stored position positioned within said housing or in a deployed position extending outwardly of said open end, said casing including a first end wall, a second end wall and a perimeter wall extending between said first and second end walls, said casing having a door therein extending between said first and second end walls;
   a spindle being rotatably mounted in said casing and extending between said first and second end walls;
   a flexible panel defining a rug has a first end edge and a second end edge disposed opposite of each other, said first end edge being attached to said spindle, said spindle being rotated in a first direction to position said panel in a rolled up configuration on said spindle, said spindle being rotated in a second direction remove said panel from said spindle to position said panel on a ground surface, said panel being removably coupled to said spindle to allow said panel to be removed from said spindle;
   a pair of brushes being mounted to said casing, said panel being extended between said brushes when said spindle is rolled in said first direction to clean an upper surface and a bottom surface of said panel with said brushes;
   an extension assembly mechanically engaging said housing and said casing, said extension assembly alternating a position of said casing between said stored and deployed positions when said extension assembly is actuated;
   a rotating assembly being mechanically coupled to said spindle, said rotating assembly alternating a rotation of said spindle in the first and second directions when said rotating assembly is actuated; and
   said housing having a plurality of rollers rotatably mounted therein, said casing being movable along said rollers.

* * * * *